United States Patent
Deets

(10) Patent No.: US 7,135,786 B1
(45) Date of Patent: Nov. 14, 2006

(54) WIND DRIVEN GENERATOR FOR POWERED VEHICLES

(76) Inventor: Edward Deets, 55 Brook La., Mountaintop, PA (US) 18707

( * ) Notice: Subject to any disclaimer, the term of this patent is extended or adjusted under 35 U.S.C. 154(b) by 0 days.

(21) Appl. No.: 11/307,533

(22) Filed: Feb. 11, 2006

(51) Int. Cl.
*F03D 9/00* (2006.01)
*H02P 9/04* (2006.01)

(52) U.S. Cl. .......................... 290/55; 290/44
(58) Field of Classification Search ............. 290/44, 290/55; 180/2.2, 165, 65.3, 65.2
See application file for complete search history.

(56) References Cited

U.S. PATENT DOCUMENTS

| | | | |
|---|---|---|---|
| 1,423,514 A | | 7/1922 | Butusov |
| 2,409,439 A | * | 10/1946 | Law ........................... 415/4.1 |
| 3,556,239 A | | 1/1971 | Spahn |
| 3,621,930 A | * | 11/1971 | Dutchak ................... 180/65.3 |
| 3,876,925 A | | 4/1975 | Stoeckert |
| 4,019,828 A | * | 4/1977 | Bunzer ......................... 416/55 |
| 4,168,759 A | * | 9/1979 | Hull et al. .................... 180/2.2 |
| 4,179,007 A | | 12/1979 | Howe |
| 4,265,591 A | * | 5/1981 | Gurbin ........................ 415/148 |
| 4,314,160 A | | 2/1982 | Boodman et al. |
| 4,423,368 A | | 12/1983 | Bussiere |
| 4,424,452 A | * | 1/1984 | Francis ......................... 290/55 |
| 5,280,827 A | | 1/1994 | Taylor et al. |
| 5,287,004 A | | 2/1994 | Finley |
| 5,680,032 A | | 10/1997 | Pena |
| 5,844,324 A | | 12/1998 | Spriggle |
| 5,920,127 A | | 7/1999 | Damron et al. |
| 5,986,429 A | | 11/1999 | Mula, Jr. |
| 6,138,781 A | * | 10/2000 | Hakala ......................... 180/2.2 |
| 6,373,145 B1 | * | 4/2002 | Hamrick ....................... 290/44 |
| 6,700,215 B1 | * | 3/2004 | Wu .............................. 290/44 |
| 2003/0132638 A1 | | 7/2003 | Simonsen |
| 2003/0155464 A1 | | 8/2003 | Tseng |
| 2005/0046195 A1 | * | 3/2005 | Kousoulis .................... 290/44 |
| 2005/0098361 A1 | * | 5/2005 | Mitchell ...................... 180/2.2 |

FOREIGN PATENT DOCUMENTS

JP       358079678 A  *  5/1983

* cited by examiner

*Primary Examiner*—Julio C. Gonzalez
(74) *Attorney, Agent, or Firm*—Mitchell A. Smolow

(57) ABSTRACT

A shrouded enclosure is mounted to a vehicle roof, the shrouded enclosure comprising an air intake formed by controllable shrouds, a turbine, an electricity generating device, and a discharge outlet. The turbine is interposed between the air intake and the discharge outlet, operatively connected to the electricity generating device and adapted to operate by the air passing through the shrouded enclosure when the vehicle is in motion. The turbine rotates about a turbine shaft mounted on a pair of bearing towers. The rotational energy of the turbine shaft is transferred to the electricity generating device. A base plate is interposed between the shrouded enclosure and the mounting surface of the vehicle. An electrical circuit provides electrical continuity between the electricity generating device and the battery during predetermined periods thereby generating electrical energy to charge the battery with the generated electrical energy. The controllable shrouds are opened to a predetermined position during the predetermined periods of electrical continuity and are otherwise closed to form a predetermined aerodynamic shape to reduce drag during vehicle movement.

25 Claims, 3 Drawing Sheets

WIND DRIVEN GENERATOR FOR POWERED VEHICLES

FIELD OF THE INVENTION

This invention relates generally to an electrically powered vehicle and more particularly to a system for charging an electrically powered vehicle battery utilizing a controllable shrouded wind-operated turbine and an electricity generating device for charging the batteries while the vehicle is in motion.

BACKGROUND OF THE INVENTION

Increasing use of gasoline-powered vehicles significantly contributes to environmental pollution, noise and depletion of crude oil reserves. Electrically-powered vehicles are known to solve some of the problems associated with gasoline-powered vehicles, but such vehicles are not yet in widespread use. Electrically-powered vehicles have certain drawbacks as compared to vehicles powered by conventional gasoline engines and newer hybrid vehicles.

Significant drawbacks include limited travel range between battery recharging and excessive time required for recharging the batteries. The average travel distance between battery recharging for currently available electrically powered vehicles is considerably less than the travel distance achieved between gasoline refills of gasoline or hybrid powered vehicles. Also, it usually takes several hours to recharge the batteries during which time the vehicle remains inoperative.

Use of electrically-powered vehicles with the concomitant environmental advantages can be significantly increased by enlarging the travel range of electrically-powered vehicles between battery recharging downtimes. One way to increase the travel range of electrically-powered vehicles is to charge the batteries while the vehicle is in motion. Typically, this has been accomplished by using wind resistance to generate electrical power. Many variations on this theme have been described in the art, but all have inherent limitations. Accordingly, there is still a continuing need to develop more efficient ways to charge batteries while the vehicle is in motion. The present invention fulfills this need and further provides related advantages.

BRIEF SUMMARY OF THE INVENTION

The present invention provides for a wind-powered battery charging system for an electrically-powered vehicle, a vehicle utilizing that system, and a method for charging a vehicle battery using air or wind power.

In a first preferred embodiment, a shrouded enclosure is mounted to a vehicle roof, the shrouded enclosure comprising an air intake formed by controllable shrouds, a turbine, an electricity generating device, and a discharge outlet. The turbine is interposed between the air intake and the discharge outlet, operatively connected to the electricity generating device and adapted to operate by the air passing through the shrouded enclosure when the vehicle is in motion.

The turbine rotates about a turbine shaft mounted on a pair of bearing towers. The rotational energy of the turbine shaft is transferred to the electricity generating device. A base plate is interposed between the shrouded enclosure and the mounting surface of the vehicle.

An electrical circuit provides electrical continuity between the electricity generating device and the battery during predetermined periods thereby generating electrical energy to charge the battery with the generated electrical energy. The controllable shrouds are opened to a predetermined position during the predetermined periods of electrical continuity and are otherwise closed to form a predetermined aero dynamical shape to reduce drag during vehicle movement.

In a second preferred embodiment, a method for charging a battery in an electrically-powered vehicle is provided. The method comprises opening the shrouds of a shrouded enclosure to capture air at the front of the shrouded enclosure as the vehicle moves in a forward direction. The shrouded enclosure comprises an air intake formed by controllable shrouds, a turbine, an electricity generating device, and a discharge outlet. The turbine is interposed between the air intake and the discharge outlet, operatively connected to the electricity generating device and adapted to operate by the air passing through the shrouded enclosure when the vehicle is in motion. An electrical circuit provides electrical continuity between the electricity generating device and the battery during predetermined periods thereby generating electrical energy to charge the battery with the generated electrical energy.

Once the shrouds are opened, the captured air is passed rearward through the enclosure thereby rotating a turbine with the captured air and generating electricity to recharge the battery. The captured air is exhausted through an air discharge outlet. The shrouds are closed upon full battery recharge.

One advantage of the present invention is the ability to utilize the controllable shrouds to both enhance air intake when open and reduce aerodynamic drag when closed.

Another advantage of the present invention is the ability to increase turbine bearing life through closure of the shrouds, thereby reducing the amount of time the turbine turns.

Examples of the more important features of the invention have been summarized rather broadly in order that detailed description that follows may be better understood. Other features and advantages of the present invention will be apparent from the following more detailed description of the preferred embodiments, taken in conjunction with the accompanying drawings which illustrate, by way of example, the principles of the invention.

DETAILED DESCRIPTION OF THE INVENTION

Figure 1:
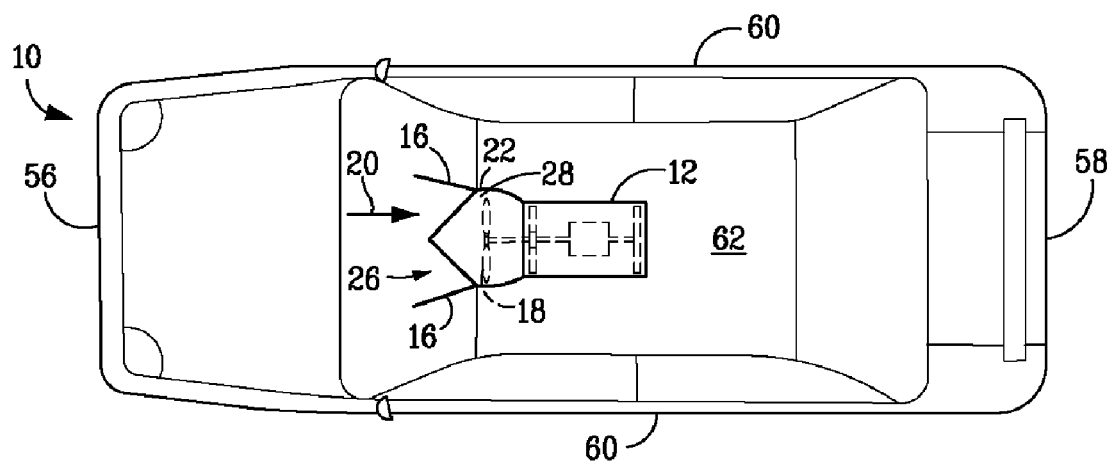
FIG. 1 is a top view of the shrouded enclosure mounted to the vehicle roof with the shrouds open.
Figure 4:
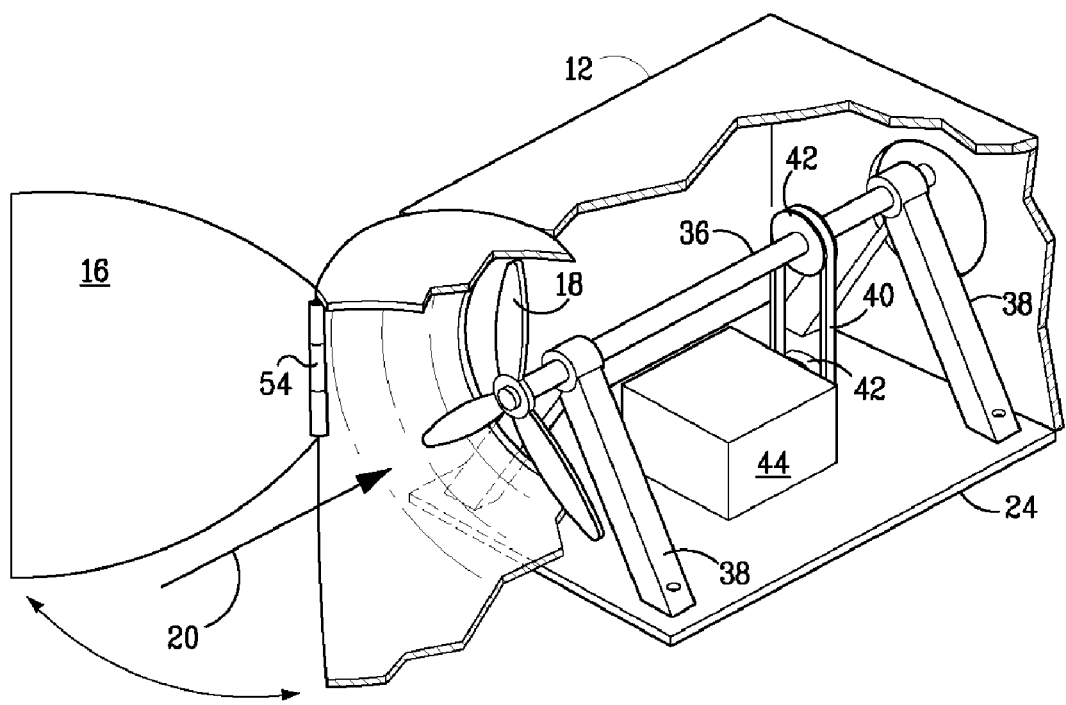
FIG. 4 is a partial elevational view of the shrouded enclosure.

According to one embodiment of the present invention, FIG. 1 shows a top view of electrically-powered vehicle 10 having a front 56, rear 58, opposing longitudinal sides 60 and roof 62. A controllable shrouded enclosure 12 is mounted to vehicle roof 62 using base plate 24 (FIG. 4).

Figure 2:
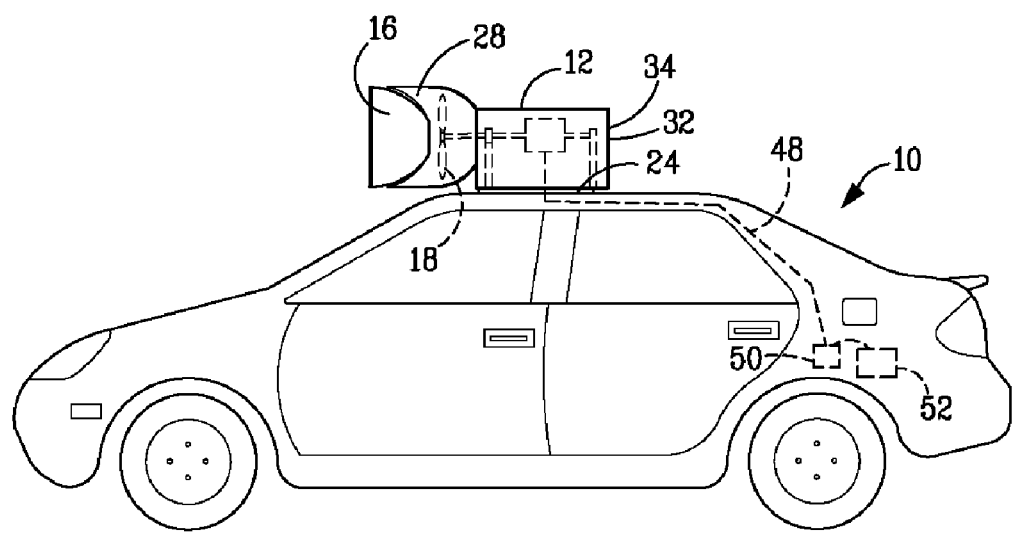
FIG. 2 is a side view of the shrouded enclosure mounted to the vehicle roof with the shrouds open.

Controllable shrouds 16 are hingedly mounted to shrouded enclosure front end 22 to channel air to turbine 18. As used herein, the term turbine refers to all known wind driven devices, for example, propellers, windmills and the like. FIG. 2 shows a side view and FIG. 3 shows a front view of controllable shrouded enclosure 12 mounted to vehicle 10.

Figure 3:
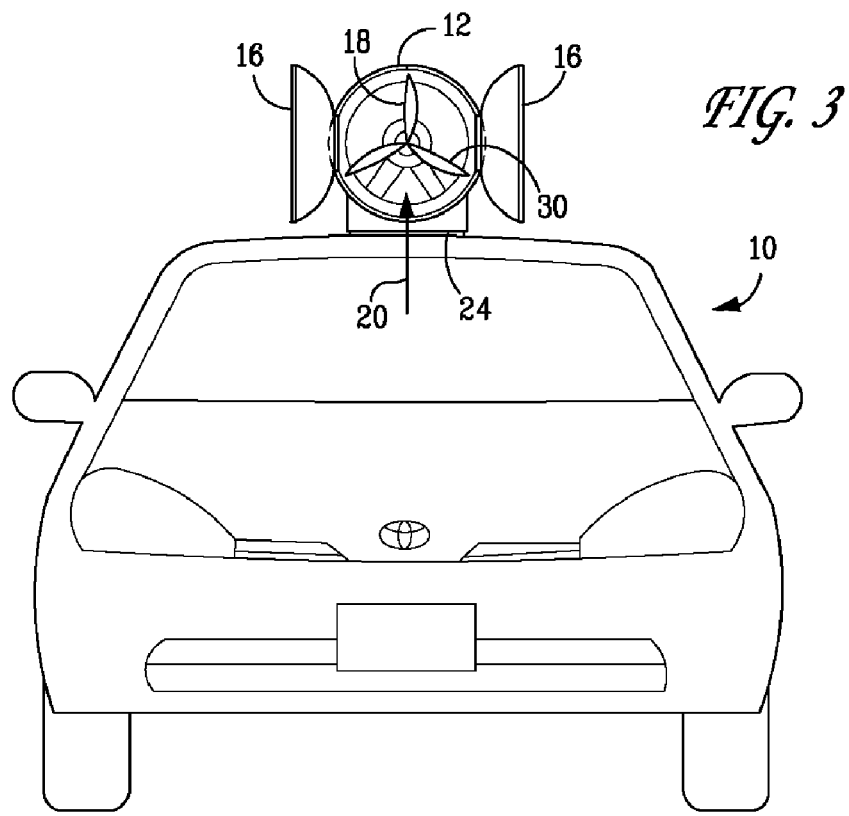
FIG. 3 is a front view of the shrouded enclosure mounted to the vehicle roof with the shrouds open.

Referring to FIGS. 1–3, controllable shrouded enclosure 12 has air intake 20 disposed longitudinally to vehicle 10. Controllable shrouded enclosure 12 is optionally sealed from the outside air. Air intake 20 is formed by open shrouds 16. As vehicle 10 moves in a forward direction, air or wind enters air intake 20. Optionally, but preferably, shrouds 16 are open so as to form a funnel from shroud forward opening 26 to turbine 18. Turbine 18 is positioned at shrouded enclosure forward opening 28. The cross-sectional area of air intake 20 is greatest at forward opening 26 and decreases in the direction of the air flow from forward opening 26 to turbine 18. As air flows through air intake 20, it is compressed and accelerated by the converging walls of shrouds 16 and passed to turbine 18.

Turbine 18 has a plurality of blades 30 designed to operatively engage the air flowing through turbine 18. Turbine 18 rotates about its horizontal axis. Air impinges on blades 30 of turbine 18 and applies a force that causes turbine 18 to rotate. Although the embodiment of FIG. 2 shows turbine 18 positioned at shrouded enclosure forward opening 28, its relative placement in shrouded enclosure 12 will depend upon the design criteria used. Air outlet 32 is located at shrouded enclosure rearward end 34. Air, having passed through turbine 18, is discharged into the atmosphere via air outlet 32.

FIG. 4 shows a partial elevational view of shrouded enclosure 12 comprising air intake 20, turbine 18, turbine shaft 36, bearing towers 38, fan belt 40, pulleys 42, and electricity generating device, for example, an alternator 44 or generator according to an embodiment of the present invention. Turbine 18 rotates about horizontal turbine shaft 36, which is supported by bearing towers 38. Bearing towers 38 are fastened to base plate 24 for support. Pulleys are fastened to turbine shaft 36 and alternator 44.

Alternator 44 is positioned below turbine shaft 36 and mounted to base plate 24. Fan belt 40 rotatively engages pulleys for transferring rotational energy from turbines 18 to alternator 44. As turbine 18 is rotated by air flowing through shrouded enclosure 12, the rotational energy imparted to turbine 18 is transferred via fan belt 40 and pulleys 42 to alternator 44.

The rotational energy imparted to alternator 44 causes alternator 44 to generate electricity. Alternator 44 is operatively connected by electrical circuitry 48 to regulator 50 which is thereafter electrically connected to at least one storage battery 52. The electricity generated by alternator 44 charges storage battery 52. Regulator 50 prevents overcharging of battery 52 in conventional fashion.

Figure 5:
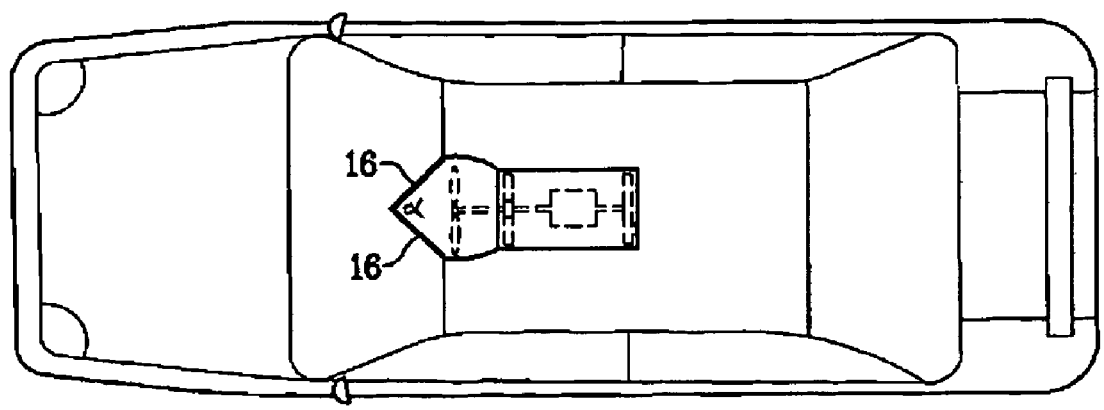
FIG. 5 is a top view of the shrouded enclosure mounted to the vehicle roof with the shrouds closed.
Figure 6:
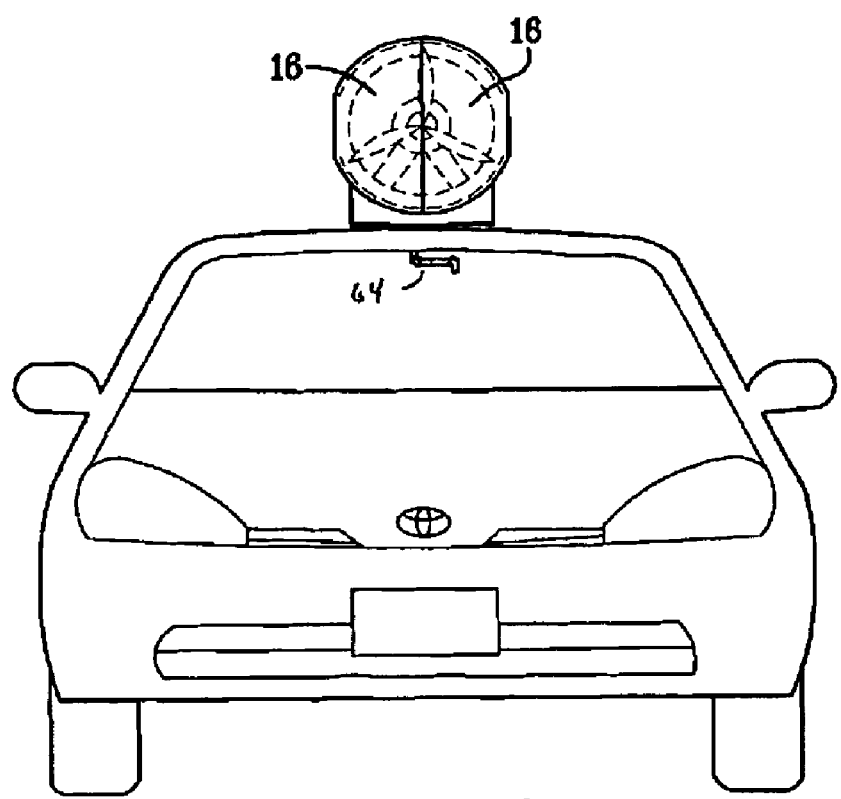
FIG. 6 is a front view of the shrouded enclosure mounted to the vehicle roof with the shrouds closed.

Referring to FIGS. 2, 5 and 6, when charging of battery 52 is not required, shrouds 16 are closed using mechanically connected servos 54 (FIG. 4) to form an aerodynamic shape that effectively reduces drag. In a preferred embodiment, depicted in FIG. 5 shrouds 16 meet to form angle α. Angle α creates a conical shape which serves to aerodynamically deflect oncoming air. In the preferred embodiment, servos 56 are electrically connected to regulator 50 using known electrical components such that when regulator 50 opens the circuit to battery 52, servos 54 are energized to close shrouds 16. Conversely, when regulator 50 closes the circuit to battery 52 (thereby allowing battery 52 to charge), servos 54 are energized to open shrouds 16. Alternatively, electrical connection to servos 54 may be independent of regulator 50, thereby allowing operator control of shrouds 16. Optionally, a manual hand crank 64 may be utilized as a backup to, or as a replacement for, electrical operation of shrouds 16.

The various components cooperate to provide an energy-efficient system. Storage batteries 52 provides electrical energy for powering electrical vehicle 10. At a predetermined need for battery charging, shrouds 16 are opened. As vehicle 10 is driven in a forward direction, air or wind is channeled through air intake 20 to turbine 18, causing it to rotate. That rotational energy is transferred, via turbine shaft 36 and fan belt 40 to alternator 44, where the rotation causes alternator 44 to generate electricity, which is used to recharge storage battery 52. At a predetermined amount of battery charge, regulator 50 prevents further battery charge and shrouds 16 are closed. Thus, a clean, energy-efficient, self-contained, closed-loop system is provided.

Although the present invention has been described in connection with specific examples and embodiments, those skilled in the art will recognize that the present invention is capable of other variations and modifications within its scope. For example, alternator 44 may be directly connected to turbine shaft 36, thereby omitting fan belt 40.

These examples and embodiments are intended as typical of, rather than in any way limiting on, the scope of the present invention as presented in the appended claims.

What is claimed is:

1. An electrically-powered vehicle having a roof and a battery for storing and providing electrical energy, comprising:
   a shrouded enclosure mounted to the roof, the shrouded enclosure comprising an air intake formed by controllable shrouds, a turbine, an electricity generating device, and a discharge outlet;
   wherein the turbine is interposed between the air intake and the discharge outlet, rotatively connected to the electricity generating device and adapted to operate by the air passing through the shrouded enclosure when the vehicle is in motion;
   the electricity generating device is in electrical continuity with the battery during predetermined periods thereby generating electrical energy to charge the battery with the generated electrical energy; and
   the controllable shrouds are hingedly attached to the shrouded enclosure and are opened to a predetermined position during the predetermined periods and are otherwise closed to form a predetermined angle thereby creating a conical shape to deflect oncoming air.

2. The vehicle of claim 1 further having a circuitry operatively connecting the electricity generating device to a regulator to control the electrical continuity.

3. The vehicle of claim 1, wherein the enclosure is substantially sealed from outside air.

4. The vehicle of claim 1 wherein the opened controllable shrouds form a funnel from a shroud forward opening to the turbine.

5. The vehicle of claim 1 wherein the turbine rotates about a turbine shaft having a fan belt receptor for receiving a fan belt operatively connected to the electricity generating device, the turbine shaft support by a plurality of bearing towers mounted to a base plate, the base plate mounted to the roof.

6. The vehicle of claim 5 further including a pulley operatively connecting the fan belt to the electricity generating device.

7. The vehicle of claim 1 wherein the electricity generating device comprises an alternator.

8. The vehicle of claim 7 wherein the electricity generating device further comprises a regulator.

9. The vehicle of claim 1 wherein the electricity generating device is mounted to the base plate.

10. The vehicle of claim 2 wherein the controllable shrouds are opened and closed by electric servos in electrical continuity with the regulator.

11. The vehicle of claim 1 wherein the controllable shrouds are opened and closed by operator controlled electric servos.

12. The vehicle of claim 1 wherein the controllable shrouds are opened and closed by a mechanical hand crank.

13. A wind-powered battery charging system for an electrically-powered vehicle comprising:
   a shrouded enclosure mounted to a vehicle roof, the shrouded enclosure comprising an air intake formed by controllable shrouds, a turbine, an electricity generating device, and a discharge outlet;
   wherein the turbine is interposed between the air intake and the discharge outlet, rotatively connected to the electricity generating device and adapted to operate by the air passing through the shrouded enclosure when the vehicle is in motion;
   the electricity generating device is in electrical continuity with a vehicle battery during predetermined periods thereby generating electrical energy to charge the battery with the generated electrical energy; and
   the controllable shrouds are hingedly attached to the shrouded enclosure and are opened to a predetermined position during the predetermined periods and are otherwise closed to form a predetermined angle thereby creating a conical shape to deflect oncoming air.

14. The wind-powered battery charging system of claim 13 further having a circuitry operatively connecting the electricity generating device to a regulator to control the electrical continuity.

15. The wind-powered battery charging system of claim 13 wherein the enclosure is substantially sealed from outside air.

16. The wind-powered battery charging system of claim 13 wherein the opened controllable shrouds form a funnel from a shroud forward opening to the turbine.

17. The wind-powered battery charging system of claim 13 wherein the turbine rotates about a turbine shaft having a fan belt receptor for receiving a fan belt operatively connected to the electricity generating device, the turbine shaft support by a plurality of bearing towers mounted to a base plate, the base plate mounted to the roof.

18. The wind-powered battery charging system of claim 17 further including a pulley operatively connecting the fan belt to the electricity generating device.

19. The wind-powered battery charging system of claim 13 wherein the electricity generating device comprises an alternator.

20. The wind-powered battery charging system of claim 19 wherein the electricity generating device further comprises a regulator.

21. The wind-powered battery charging system of claim 13 wherein the electricity generating device is mounted to the base plate.

22. The wind-powered battery charging system of claim 14 wherein the controllable shrouds are opened and closed by electric servos in electrical continuity with the regulator.

23. The wind-powdered battery charging system of claim 1 wherein the controllable shrouds are opened and closed by operator controlled electric servos.

24. The vehicle of claim 13 wherein the controllable shrouds are opened and closed by a mechanical hand crank.

25. A method for charging a battery in an electrically-powered vehicle comprising:
   (a) opening a plurality of shrouds to capture air as the vehicle moves in a forward direction;
   (b) passing the captured air rearward through a shrouded enclosure mounted to a vehicle roof, the shrouded enclosure comprising an air intake formed by controllable shrouds, a turbine, an electricity generating device, and a discharge outlet; and
   (c) closing the plurality of shrouds upon a predetermined amount of recharging of a vehicle battery;
   wherein
   1. the turbine is interposed between the air intake and the discharge outlet, rotatively connected to the electricity generating device and adapted to operate by the air passing through the shrouded enclosure when the vehicle is in motion;
   2. the electricity generating device is in electrical continuity with the vehicle battery and a regulator, thereby generating electrical energy to charge the battery with the generated electrical energy, as controlled by the regulator; and
   3. the controllable shrouds are hingedly attached to the shrouded enclosure and are opened by a servo in electrical continuity with and controlled by the regulator to a predetermined position and are otherwise closed to form a predetermined angle thereby creating a conical shape to deflect oncoming air.

* * * * *